United States Patent
Kolb et al.

(10) Patent No.: US 9,815,926 B2
(45) Date of Patent: *Nov. 14, 2017

(54) ETHYLENE COPOLYMERS, METHODS FOR THEIR PRODUCTION, AND USE

(71) Applicant: ExxonMobil Chemical Patents Inc., Baytown, TX (US)

(72) Inventors: Rainer Kolb, Kingwood, TX (US); Donna J. Crowther, Seabrook, TX (US); Peijun Jiang, League City, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/234,734

(22) Filed: Aug. 11, 2016

(65) Prior Publication Data

US 2016/0347893 A1 Dec. 1, 2016

Related U.S. Application Data

(62) Division of application No. 14/088,126, filed on Nov. 22, 2013, now Pat. No. 9,441,060, which is a division of application No. 13/005,356, filed on Jan. 12, 2011, now Pat. No. 8,618,033.

(60) Provisional application No. 61/297,621, filed on Jan. 22, 2010, provisional application No. 61/368,997, filed on Jul. 29, 2010.

(51) Int. Cl.
*C08F 210/16* (2006.01)
*C08F 210/06* (2006.01)
*C08F 4/6592* (2006.01)
*C08F 4/659* (2006.01)

(52) U.S. Cl.
CPC .......... *C08F 210/16* (2013.01); *C08F 210/06* (2013.01); *C08F 4/65908* (2013.01); *C08F 4/65927* (2013.01)

(58) Field of Classification Search
CPC ................ C08F 210/16; C08F 4/61927; C08F 4/63927; C08F 4/65927
USPC ......................................... 526/348, 160, 170
See application file for complete search history.

(56) References Cited

U.S. PATENT DOCUMENTS

| | | |
|---|---|---|
| 2,969,324 A | 1/1961 | Knapp, Jr. et al. |
| 3,760,001 A | 9/1973 | Staendeke |
| 3,778,375 A | 12/1973 | Braid et al. |
| 3,779,928 A | 12/1973 | Schlicht |
| 3,852,205 A | 12/1974 | Kablaoui et al. |
| 3,879,306 A | 4/1975 | Kablaoui et al. |
| 3,932,290 A | 1/1976 | Koch et al. |
| 3,933,659 A | 1/1976 | Lyle et al. |
| 4,028,258 A | 6/1977 | Kablaoui et al. |
| 4,105,571 A | 8/1978 | Shaub et al. |
| 4,176,074 A | 11/1979 | Coupland et al. |
| 4,344,853 A | 8/1982 | Gutierrez et al. |
| 4,464,493 A | 8/1984 | Joffrion |
| 4,540,753 A | 9/1985 | Cozewith et al. |
| 4,542,199 A | 9/1985 | Kaminsky et al. |
| 4,752,597 A | 6/1988 | Turner |
| 4,792,595 A | 12/1988 | Cozewith et al. |
| 4,804,794 A | 2/1989 | Ver Strate et al. |
| 4,871,705 A | 10/1989 | Hoel |
| 4,892,851 A | 1/1990 | Ewen et al. |
| 4,959,436 A | 9/1990 | Cozewith et al. |
| 5,008,204 A | 4/1991 | Stehling |
| 5,017,714 A | 5/1991 | Welborn, Jr. |
| 5,026,798 A | 6/1991 | Canich |
| 5,055,438 A | 10/1991 | Canich |
| 5,068,047 A | 11/1991 | Chung et al. |
| 5,096,867 A | 3/1992 | Canich |
| 5,120,867 A | 6/1992 | Welborn, Jr. |
| 5,132,262 A | 7/1992 | Rieger et al. |
| 5,132,281 A | 7/1992 | Chevallier et al. |
| 5,151,204 A | 9/1992 | Struglinski |
| 5,153,157 A | 10/1992 | Hlatky et al. |
| 5,155,080 A | 10/1992 | Elder |
| 5,198,401 A | 3/1993 | Turner et al. |

(Continued)

FOREIGN PATENT DOCUMENTS

| | | |
|---|---|---|
| EP | 0 129 414 B | 12/1984 |
| EP | 0 277 003 A | 8/1988 |
| EP | 0 277 004 A | 8/1988 |
| EP | 0 287 239 A | 10/1988 |
| EP | 0 426 637 B | 5/1991 |
| EP | 0 427 697 A | 5/1991 |
| EP | 0 495 375 B | 7/1992 |
| EP | 0 500 944 A | 9/1992 |
| EP | 0 511 665 A | 11/1992 |
| EP | 0 520 732 A | 12/1992 |

(Continued)

OTHER PUBLICATIONS

Sun et al., "A Study of the Separation Principle in Size Exclusion Chromatography", Macromolecules, vol. 37, No. 11, pp. 4304-4312 (2004).

Sun et al., "Effect of Short Chain Branching on the Coil Dimensions of Polyolefins in Dilute Solution", Macromolecules, vol. 34, No. 19, pp. 6812-6820 (2001).

(Continued)

*Primary Examiner* — Roberto Rabago
(74) *Attorney, Agent, or Firm* — Darryl M. Tyus

(57) ABSTRACT

Provided herein are ethylene copolymers, methods for making such copolymers, and compositions made from such copolymers. The ethylene copolymers have 70 wt. % to 85 wt. % of units derived from ethylene and at least 12 wt. % of units derived from at least one α-olefin having 3 to 20 carbon atoms. The copolymers preferably further have a weight-average molecular weight (Mw) ranging from about 50,000 to about 200,000 g/mol, melting point of at least 100° C., ratio of Mw/Mn of about 1.5 to about 3.5, a content of group 4 metals of no more than 25 ppm, and a ratio of wt ppm Group 4 metals/wt ppm Group 5 metals of at least 3. Such copolymers may be particularly useful as viscosity modifiers for lubricating oil compositions.

7 Claims, 1 Drawing Sheet

(56) References Cited

U.S. PATENT DOCUMENTS

| | | | |
|---|---|---|---|
| 5,243,001 A | 9/1993 | Winter et al. |
| 5,264,405 A | 11/1993 | Canich |
| 5,278,119 A | 1/1994 | Turner et al. |
| 5,278,264 A | 1/1994 | Spaleck et al. |
| 5,296,434 A | 3/1994 | Karl et al. |
| 5,304,614 A | 4/1994 | Winter et al. |
| 5,318,935 A | 6/1994 | Canich et al. |
| 5,324,800 A | 6/1994 | Welborn, Jr. et al. |
| 5,382,630 A | 1/1995 | Stehling et al. |
| 5,387,568 A | 2/1995 | Ewen et al. |
| 5,391,617 A | 2/1995 | Olivier et al. |
| 5,391,629 A | 2/1995 | Turner et al. |
| 5,446,221 A | 8/1995 | Struglinski |
| 5,451,630 A | 9/1995 | Olivier et al. |
| 5,451,636 A | 9/1995 | Olivier et al. |
| 5,621,126 A | 4/1997 | Canich et al. |
| 5,665,800 A | 9/1997 | Lai et al. |
| 5,837,773 A | 11/1998 | Olivier et al. |
| 5,955,625 A | 9/1999 | Canich |
| 5,969,070 A | 10/1999 | Waymouth et al. |
| 6,034,187 A | 3/2000 | Maehama et al. |
| 6,218,488 B1 | 4/2001 | Schiffino et al. |
| 6,265,338 B1 | 7/2001 | Canich |
| RE37,400 E | 10/2001 | Canich |
| 6,319,998 B1 | 11/2001 | Cozewith et al. |
| 6,376,409 B1 | 4/2002 | Burkhardt et al. |
| 6,376,412 B1 | 4/2002 | Burkhardt et al. |
| 6,380,120 B1 | 4/2002 | Burkhardt et al. |
| RE37,788 E | 7/2002 | Canich |
| 6,525,007 B2 | 2/2003 | Okada et al. |
| 6,589,920 B2 | 7/2003 | Okada et al. |
| 6,638,887 B1 | 10/2003 | Canich |
| 6,753,381 B2 | 6/2004 | Mishra et al. |
| 6,835,698 B2 | 12/2004 | Egawa et al. |
| 6,881,800 B2 | 4/2005 | Friedersdorf |
| 7,163,907 B1 | 1/2007 | Canich et al. |
| 7,232,871 B2 | 6/2007 | Datta et al. |
| 7,402,235 B2 | 7/2008 | Huang |
| 7,569,646 B1 | 8/2009 | Canich |
| 7,662,433 B2 | 2/2010 | Ford et al. |
| 7,776,804 B2 | 8/2010 | Huang et al. |
| 7,776,805 B2 | 8/2010 | Matsuda et al. |
| 7,875,690 B2 | 1/2011 | Graham et al. |
| 7,915,192 B2 | 3/2011 | Arriola et al. |
| 7,915,358 B2 | 3/2011 | Ikeda et al. |
| 8,084,560 B2 | 12/2011 | Kolb et al. |
| 8,329,835 B2 | 12/2012 | Goode et al. |
| 8,378,043 B2 | 2/2013 | Graham et al. |
| 8,378,048 B2 | 2/2013 | Kolb et al. |
| 8,618,033 B2 * | 12/2013 | Kolb | C08F 210/02 508/591 |
| 9,416,206 B2 | 8/2016 | Kolb et al. |
| 2002/0055445 A1 | 5/2002 | Okada et al. |
| 2003/0087772 A1 | 5/2003 | Okada et al. |
| 2004/0038850 A1 | 2/2004 | Huang |
| 2004/0121922 A1 | 6/2004 | Okada et al. |
| 2008/0038533 A1 * | 2/2008 | Best | B32B 27/32 428/220 |
| 2009/0209721 A1 | 8/2009 | Ikeda et al. |
| 2010/0197540 A1 | 8/2010 | Shan et al. |
| 2010/0273693 A1 | 10/2010 | Datta et al. |
| 2010/0273936 A1 | 10/2010 | Yeh et al. |
| 2010/0292114 A1 | 11/2010 | Huang et al. |
| 2011/0183878 A1 | 7/2011 | Kolb et al. |
| 2012/0028867 A1 | 2/2012 | Datta et al. |

FOREIGN PATENT DOCUMENTS

| | | |
|---|---|---|
| EP | 0 570 982 A | 11/1993 |
| EP | 0 573 403 A | 12/1993 |
| EP | 0 577 581 A | 1/1994 |
| EP | 0 578 838 A | 1/1994 |
| EP | 0 612 768 A | 8/1994 |
| EP | 0 638 611 A | 2/1995 |
| EP | 1 148 115 A | 10/2001 |
| EP | 1 178 102 A | 2/2002 |
| EP | 1 262 498 A | 12/2002 |
| JP | 07-149963 A | 6/1995 |
| WO | 92/00333 A | 1/1992 |
| WO | 93/10495 A | 5/1993 |
| WO | 93/19103 A | 9/1993 |
| WO | 99/07788 A | 2/1999 |
| WO | 99/29743 A | 6/1999 |
| WO | 99/45062 A | 9/1999 |
| WO | 99/60033 A | 11/1999 |
| WO | 01/48034 A | 7/2001 |
| WO | 02/34795 A | 5/2002 |
| WO | 02/46251 A | 6/2002 |
| WO | 03/040201 A | 5/2003 |
| WO | 2005/113622 A | 12/2005 |
| WO | 2006/102146 A | 9/2006 |
| WO | 2009/012153 A | 1/2009 |
| WO | 2010/126721 A | 11/2010 |

OTHER PUBLICATIONS

H.N. Cheng et al., "$_{13}$ C NMR Analysis of Compositional Heterogeneity in Ethylene-Propylene Copolymers", Macromolecules, vol. 24, No. 8, pp. 1724-1726 (1991).

H.N. Cheng, "$_{13}$ C NMR Analysis of Ethylene-Propylene Rubbers", Macromolecules, vol. 17, No. 10, pp. 1950-1955 (1984).

C. Cozewith, "Interpretation of $_{13}$ C NMR Sequence Distribution for Ethylene-Propylene Copolymers Made with Heterogeneous Catalysts", vol. 20, No. 6, pp. 1237-1244 (1987).

C. Cozewith et al., "Ethylene-Propylene Copolymers. Reactivity Ratios, Evaluation, and Significance", Macromolecules, vol. 4, pp. 482-489 (1971).

Kakugo et al., "$_{13}$ C NMR Determination of Monomer Sequence Distribution in Ethylene-Propylene Copolymers Prepared with $\delta$-TiCl $_3$ -Al(C$_2$ H $_5$ ) $_2$ Cl", Macromolecules, vol. 15, No. 4, pp. 1150-1152 (1982).

J.C. Randall, "Methylene Sequence Distributions and NumberAverage Sequence Lengths in Ethylene-Propylene Copolymers", Macromolecules, vol. 11, No. 1, pp. 33-36 (1978).

Wild et al., "Determination of Branching Distributions in Polyethylene and Ethylene Copolymers", J. Poly Sci., Poly. Phys. Ed., vol. 20, pp. 441-455 (1982).

G.J. Ray et al., "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, No. 4, pp. 773-778 (1977).

W. Spaleck et al., "The Influence of Aromatic Substituents on the Polymerization Behavior of Bridged Zirconocene Catalysts", Organometallics, vol. 13, pp. 954-963 (1994).

H. Brintzinger et al., "ansa-Zirconocene Polymerization Catalysts with Annelated Ring Ligands-Effects on CatalyticActivity and Polymer Chain Length", Organometallics, vol. 13, pp. 964-970 (1994).

A.C. Ouano, "Gel Permeation Chromatography", Polymer Molecular Weights Part II, ed. P.E. Slade, ed., Marcel Dekker, Inc., NY, pp. 287-368 (1975).

F. Rodriguez, "The Molecular Weight of Polymers", Principles of Polymer System, 3rd ed., Hemisphere Pub. Corp., NY, pp. 155-160 (1989).

G. Ver Strate et al., "Near Monodisperse Ethylene-Propylene Copolymers by Direct Ziegler-Natta Polymerization. Preparation, Characterization, Properties", Macromolecules, vol. 21, pp. 3360-3371 (1988).

Wittig, H. et al., "Über neue Triaryl-bor-Ver-bindungen und ihre Tetraarylo-borat-Komplexe (V. Mitteil.1)", Chemische Berichte, vol. 88, pp. 962-976 (1955).

* cited by examiner

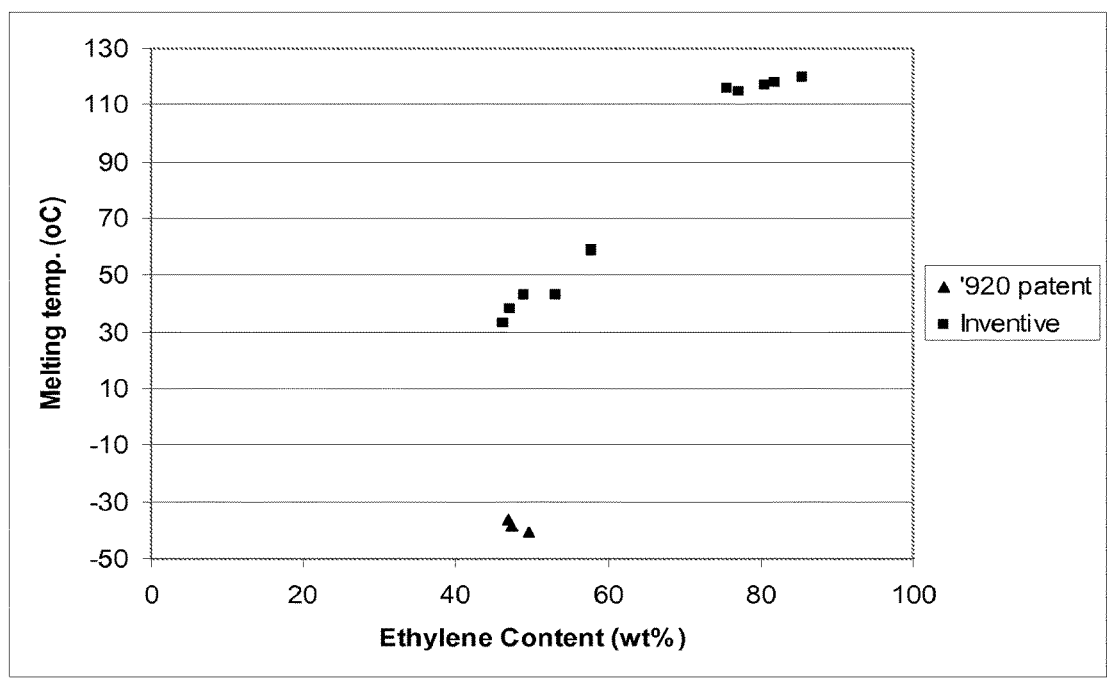

ETHYLENE COPOLYMERS, METHODS FOR THEIR PRODUCTION, AND USE

CROSS REFERENCE TO RELATED APPLICATIONS

This application is a divisional of U.S. Ser. No. 14/088,126, filed on Nov. 22, 2013 and issued as U.S. Pat. No. 9,441,060, which is a divisional of and claims priority to U.S. patent application Ser. No. 13/005,356, filed on Jan. 12, 2011, and issued as U.S. Pat. No. 8,618,033, which claims priority to and the benefit of U.S. Provisional Application No. 61/297,621, filed Jan. 22, 2010 and U.S. Provisional Application No. 61/368,997, filed Jul. 29, 2010. This application is related to U.S. patent application Ser. No. 12/761,880, filed Apr. 16, 2010 and issued as U.S. Pat. No. 8,309,501; U.S. patent application Ser. No. 12/762,096, filed Apr. 16, 2010 and issued as U.S. Pat. No. 8,389,452; U.S. patent application Ser. No. 12/569,009, filed Sep. 29, 2009 and issued as U.S. Pat. No. 8,378,042; and International Patent Application No. PCT/US2010/031190, filed Apr. 15, 2010, each of which in turn claims priority to Provisional Application No. 61/173,528, filed Apr. 28, 2009 and Provisional Application No. 61/173,501, filed Apr. 28, 2009, the disclosures of which are incorporated by reference in their entireties.

FIELD OF THE INVENTION

The present invention relates to ethylene copolymers, their production and their use, particularly as viscosity modifiers for lubricating oils.

BACKGROUND OF THE INVENTION

Ethylene copolymers, especially copolymers of ethylene with propylene optionally in combination with non-conjugated diolefins, are widely used as thermoplastic polymers, as elastomeric polymers in both vulcanized and unvulcanized compositions, in blends and as viscosity modifiers in lubricating oil formulations. One example of the use of these materials as viscosity modifiers is disclosed in U.S. Pat. No. 6,589,920.

The elastomeric properties of ethylene copolymers depend largely on the ethylene content of the copolymer since materials with higher ethylene contents have a lower entanglement molecular weight. The solution properties also depend to a large extent on the ethylene content; with a low ethylene content EP copolymer being desirable when the copolymer is intended for use as a viscosity modifier for waxy base stock oils because this provides excellent low temperature properties while maintaining good thickening efficiency. In addition, for many applications, low molecular weight EP copolymers are needed, for example to meet shear stability standards when used in motor oil formulations.

However, EP copolymers with low ethylene content, e.g., 40 to 55 weight percent (wt. %) ethylene, and low molecular weight, e.g., below 100,000 g/mol, are currently very difficult to produce and handle, particularly using most metallocene catalysts systems. Thus, these materials tend to be amorphous and have a propensity to agglomerate or cold flow and stick to finishing equipment.

Ethylene copolymers having a high ethylene content, e.g., ranging from 70 wt. % to 90 wt. %, are also desirable because of their outstanding low temperature impact strength due to low crystallinity, low modulus, and high flexibility. Furthermore, metallocene based EP copolymers with ethylene contents ranging from 70 wt. % to 90 wt. % show very good organoleptics, i.e., low odor/taste/extractables, due to their narrow molecular weight distribution as compared to Ziegler/Natta based copolymers. However, these copolymers are also difficult to handle and may have an unacceptably low service temperatures due to the inherently low melting point of the random copolymers produced using most metallocene-based and Ziegler/Natta-based catalyst systems.

There is therefore, a need for ethylene copolymers having both a low ethylene content and a low molecular weight that can be handled in conventional processing equipment without the problem of agglomeration during finishing, packaging and transportation. In addition, there is a need for ethylene copolymers that have a high ethylene content in combination with a low molecular weight and that exhibit an improved melting point without loss of their low temperature properties.

SUMMARY OF THE INVENTION

It has now been found, by using a particular metallocene catalyst system, it is possible to produce a low molecular weight ethylene copolymer that has sufficient crystallinity to reduce agglomeration problems at low ethylene contents and to increase melting point at high ethylene contents, both without adversely affecting the low temperature properties of the copolymer.

In one aspect, provided is an ethylene copolymer comprising 40 wt. % to 70 wt. % of units derived from ethylene and at least 30 wt. % of units derived from at least one α-olefin having 3 to 20 carbon atoms, wherein the copolymer has the following properties:

(a) a weight-average molecular weight (Mw), as measured by gel permeation chromatography (GPC), in the range of about 50,000 to about 200,000 g/mol;

(b) a melting point (Tm) in ° C., as measured by differential scanning calorimetry (DSC), that satisfies the relation:

$$Tm > 3.4 \times E - 180$$

where E is the weight % of units derived from ethylene in the copolymer;

(c) a ratio of Mw/Mn of about 1.8 to about 2.5;

(d) a content of Group 4 metals of no more than 5 ppm; and (e) a ratio of wt ppm Group 4 metals/wt ppm Group 5 metals of at least 3.

In some embodiments, said copolymer comprises 40 wt. % to 55 wt. % of units derived from ethylene and 60 wt. % to 45 wt. % of units derived from units derived from at least one α-olefin having 3 to 20 carbon atoms.

In some embodiments, the copolymer has a melting point (Tm) in ° C., as measured by DSC, that satisfies the relation: $Tm > 3.4 \times E - 170$, or the relation: $Tm > 3.4 \times E - 160$, or the relation: $Tm > 3.4 \times E - 90$, where E is as defined above.

In a further aspect, provided is an ethylene copolymer comprising 70 wt. % to 85 wt. % of units derived from ethylene and at least 12 wt. % of units derived from at least one α-olefin having 3 to 20 carbon atoms, wherein the copolymer has the following properties:

(a) a weight-average molecular weight (Mw), as measured by GPC, in the range of about 50,000 to about 200,000 g/mol;

(b) a melting point (Tm), as measured by DSC, of at least 100° C., such as at least 110° C.;

(c) a ratio of Mw/Mn of about 1.8 to about 2.5;

(d) a content of Group 4 metals of no more than 5 ppm; and (e) a ratio of wt ppm Group 4 metals/wt ppm Group 5 metals of at least 3.

In some embodiments, said at least one α-olefin is selected from propylene, butene, hexene and octene, especially propylene.

In some embodiments, the copolymer contains no more than 25 ppm of Zn.

In another aspect, provided is a process of producing an ethylene copolymer, the process comprising contacting a monomer mixture comprising 40 wt. % to 70 wt. % of ethylene and at least 30 wt. % of at least one α-olefin having 3 to 20 carbon atoms under polymerizations conditions with a catalyst composition comprising a bridged bis-indenyl complex of a transition metal to produce a copolymer having the following properties:

(a) a weight-average molecular weight (Mw), as measured by GPC, in the range of about 50,000 to about 200,000 g/mol;

(b) a melting point (Tm) in ° C., as measured by DSC, that satisfies the relation:

$$Tm > 3.4 \times E - 180$$

where E is the weight % of units derived from ethylene in the copolymer;

(c) a ratio of Mw/Mn of about 1.8 to about 2.5;

(d) a content of Group 4 metals of no more than 5 ppm; and (e) a ratio of wt ppm Group 4 metals/wt ppm Group 5 metals of at least 3.

In yet another aspect, provided is a process of producing an ethylene copolymer, the process comprising contacting a monomer mixture comprising 70 wt. % to 85 wt. % of ethylene and at least 12 wt. % of at least one α-olefin having 3 to 20 carbon atoms under polymerizations conditions with a catalyst composition comprising a bridged bis-indenyl complex of a transition metal to produce a copolymer having the following properties:

(a) a weight-average molecular weight (Mw), as measured by GPC, in the range of about 50,000 to about 200,000 g/mol;

(b) a melting point (Tm), as measured by DSC, of at least 100° C., such as at least 110° C.;

(c) a ratio of Mw/Mn of about 1.8 to about 2.5;

(d) a content of Group 4 metals of no more than 5 ppm; and (e) a ratio of ppm Group 4 metals/ppm Group 5 metals of at least 3.

In some embodiments, the bridged bis-indenyl complex comprises a dialkylsilyl bridging group and the transition metal comprises hafnium and/or zirconium.

In some embodiments, the catalyst composition comprises dimethylsilylbisindenylhafnium dimethyl.

In some embodiments, the catalyst composition comprises a fluoroarylborate activator and especially a perfluoroarylborate activator.

In still a further aspect, provided is a lubricating oil composition comprising: (a) a lubricating oil base; and (b) an ethylene copolymer as described herein.

BRIEF DESCRIPTION OF THE DRAWINGS

FIG. 1 is a graph illustrating peak melting point against ethylene content for the ethylene copolymers of the present invention and Examples 6 to 8 of U.S. Pat. No. 6,589,920.

DETAILED DESCRIPTION

Described herein is a range of ethylene-containing copolymers which exhibit low levels of crystallinity, while unexpectedly having unusually high melting points, over a wide range of ethylene concentrations. Also described are methods of producing these copolymers using a metallocene-based catalyst systems and use of the copolymers as viscosity modifiers for lubricating oils.

Ethylene Copolymer

As used herein the term "copolymer" is any polymer produced from two or more different monomers. In the present copolymers, the monomers employed comprise ethylene and one or more α-olefins having 3 to 20 carbon atoms. Suitable α-olefin comonomers include propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, and 1-dodecene. Generally, the α-olefin comonomer is selected from propylene, butene, hexene and octene, with propylene being preferred.

The present copolymers exhibit at least one of the following properties:

(i) a weight-average molecular weight (Mw), as measured by gel permeation chromatography (GPC), in the range of about 25,000 to about 500,000, or from about 40,000 to about 300,000 or from about 50,000 to about 200,000 g/mol;

(ii) a molecular weight distribution (MWD), defined as the ratio of the weight average molecular weight (Mw) to the number average molecular weight (Mn), of from about 1.5 to about 4.0 or from about 1.5 to about 3.5, or from about 1.5 to about 3.0, or from about 1.8 to about 3.0, or from about 1.8 to about 2.8, or from about 1.8 to about 2.5;

(iii) since the present copolymers are produced using a metallocene-based, rather than a Ziegler Natta, catalyst system they contain very low amounts of Group 4 metals. Preferably, the copolymers include less than 0.5 wt. % of Group 4 metals. More preferably, the copolymers are substantially free of Group 4 metals. In one or more embodiments, the copolymers include no more than about 100 ppm or no more than about 50 ppm or no more than about 25 ppm or no more than about 15 ppm or no more than about 10 ppm or no more than about 5 ppm of Group 4 metals;

(iv) a ratio of wt ppm Group 4 metals/wt ppm Group 5 metals of at least 1, or at least 2, or at least 3, or at least 4;

(v) since the present copolymers can be produced without using a chain shuttling polymerization process, such as disclosed in U.S. Patent Application Publication No. 2007/0167315, the copolymers typically contain no more than 100 ppm, or no more than 50 ppm, or no more than 25 ppm, or no more than 10 ppm, or no more than 5 ppm of Zn; and (vi) combinations of properties (i)-(v) described above.

The presence of Group 4 and Group 5 metals and/or zinc in the polymer may be measured using Inductively Coupled Plasma Atomic Emission Spectroscopy (ICP-AES); a technique that is commonly known in the art. For ICP-AES measurements, the samples to be measured are first ashed, then dissolved in an appropriate acidic solution, followed by appropriate dilution to fall within the standard calibration curve. A suitable instrument is the IRIS ADVANTAGE DUAL VIEW instrument manufactured by Thermo Electron Corporation (Now Thermo Fisher Scientific Inc., 81 Wyman Street Waltham, Mass. 02454).

In one or more embodiments, the present copolymers comprise 40 wt. % to 70 wt. %, more typically 40 wt. % to 55 wt. %, of units derived from ethylene and at least 30 wt. %, more typically 60 wt. % to 45 wt. %, of units derived from at least one α-olefin having 3 to 20 carbon atoms. Even with such a relatively low ethylene content, the copolymers have a melting point (Tm) in ° C., as measured by differential scanning calorimetry (DSC), that satisfies the relation:

$$Tm > 3.4 \times E - 180$$

where E is the weight % of units derived from ethylene in the copolymer so that, for example, with a copolymer containing 55 wt. % ethylene, the Tm is greater than 7° C. In certain cases, the copolymers of the first embodiment have a melting point (Tm) in ° C., as measured by DSC, that satisfies the relation: Tm>3.4×E−170, or the relation: Tm>3.4×E−160, or the relation: Tm>3.4×E−90, where E is as defined above.

In another embodiment, the present copolymers comprise 70 to 85 wt. % of units derived from ethylene and at least 12 wt. % of units derived from at least one α-olefin having 3 to 20 carbon atoms. In this case, the copolymers have a melting point (Tm), as measured by DSC, of at least 100° C., more typically at least 110° C.

Metallocene Catalyst System

The metallocene catalyst system employed to produce the present ethylene copolymers comprises: (i) a complex of a transition metal, often referred to as a metallocene, metallocene catalyst precursor, or catalyst precursor; and (ii) an activator.

Metallocenes

The metallocene compounds useful herein are generally known in the art, and are preferably cyclopentadienyl derivatives of titanium, zirconium and hafnium. Useful metallocenes (e.g. titanocenes, zirconocenes and hafnocenes) may be represented by the following formulae:

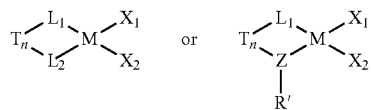

wherein M is the metal center, and is a Group 4 metal, preferably titanium, zirconium or hafnium, preferably zirconium or hafnium when $L_1$ and $L_2$ are present and preferably titanium when Z is present; n is 0 or 1;

T is an optional bridging group which, if present, in preferred embodiments is selected from dialkylsilyl, diarylsilyl, dialkylmethyl, ethylenyl (—CH$_2$—CH$_2$—) or hydrocarbylethylenyl wherein one, two, three or four of the hydrogen atoms in ethylenyl are substituted by hydrocarbyl, where hydrocarbyl can be independently $C_1$ to $C_{16}$ alkyl or phenyl, tolyl, xylyl and the like, and when T is present, the catalyst represented can be in a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl, which are optionally substituted, in which any two adjacent R groups on these rings are optionally joined to form a substituted or unsubstituted, saturated, partially unsaturated, or aromatic cyclic or polycyclic substituent;

Z is nitrogen, oxygen or phosphorus (preferably nitrogen);

R' is a cyclic linear or branched $C_1$ to $C_{40}$ alkyl or substituted alkyl group (preferably Z—R' form a cyclododecylamido group); and $X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand.

By use of the term hafnocene is meant a bridged or unbridged, bis- or mono-cyclopentadienyl (Cp) hafnium complex having at least two leaving groups $X_1$ and $X_2$, which are as defined immediately above and where the Cp groups may be substituted or unsubstituted cyclopentadiene, indene or fluorene. By use of the term zirconocene is meant a bridged or unbridged, bis- or mono-Cp zirconium complex having at least two leaving groups $X_1$ and $X_2$, which are as defined immediately above and where the Cp groups may be substituted or unsubstituted cyclopentadiene, indene or fluorene. By use of the term titanocene is meant a bridged or unbridged, bis- or mono-Cp titanium complex having at least two leaving groups $X_1$ and $X_2$, which are as defined immediately above and where the Cp groups may be substituted or unsubstituted cyclopentadiene, indene or fluorene.

Among the metallocene compounds which can be used in this invention are stereorigid, chiral or asymmetric, bridged or non-bridged, or so-called "constrained geometry" metallocenes. See, for example, U.S. Pat. Nos. 4,892,851; 5,017,714; 5,132,281; 5,155,080; 5,296,434; 5,278,264; 5,318,935; 5,969,070; 6,376,409; 6,380,120; 6,376,412; WO-A-(PCT/US92/10066); WO 99/07788; WO-A-93/19103; WO 01/48034; EP-A2-0 577 581; EP-A1-0 578 838; WO 99/29743 and also the academic literature, see e.g., "The Influence of Aromatic Substituents on the Polymerization Behavior of Bridged Zirconocene Catalysts," Spaleck, W. et al, Organometallics 1994, Vol. 13, pp. 954-963, and "ansa-Zirconocene Polymerization Catalysts with Annelated Ring Ligands-Effects on Catalytic Activity and Polymer Chain Lengths," Brintzinger, H. et al, Organometallics 1994, Vol. 13, pp. 964-970, and documents referred to therein. The bridged metallocenes disclosed in WO 99/07788 and the unbridged metallocenes disclosed in U.S. Pat. No. 5,969,070 are particularly suitable for the present invention.

Preferably, the transition metal compound is a dimethylsilylbis(indenyl) metallocene, wherein the metal is a Group 4 metal, specifically, titanium, zirconium, or hafnium, and the indenyl may be substituted by one or more substituents selected from the group consisting of a halogen atom, $C_1$ to $C_{10}$ alkyl, $C_5$ to $C_{15}$ aryl, $C_6$ to $C_{25}$ arylalkyl, and $C_6$ to $C_{25}$ alkylaryl. More preferably, the metal is zirconium or hafnium, $L_1$ and $L_2$ are unsubstituted or substituted indenyl radicals, T is dialkylsiladiyl, and $X_1$ and $X_2$ are both halogen or $C_1$ to $C_3$ alkyl. Preferably, these compounds are in the rac-form.

Illustrative, but not limiting examples of preferred stereospecific metallocene compounds are the racemic isomers of dimethylsilylbis(indenyl) metal dichloride, -diethyl or -dimethyl, wherein the metal is titanium, zirconium or hafnium, preferably hafnium or zirconium. It is particularly preferred that the indenyl radicals are not substituted by any further substituents. However, in certain embodiments the two indenyl groups may also be replaced, independently of each other, by 2-methyl-4-phenylindenyl; 2-methyl indenyl; 2-methyl, 4-[3',5'-di-t-butylphenyl]indenyl; 2-ethyl-4-[3',5'-di-t-butylphenyl]indenyl; 2-n-propyl-4-[3',5'-di-t-butylphenyl]indenyl; 2-iso-propyl-4-[3',5'-di-t-butylphenyl]indenyl; 2-iso-butyl-4-[3',5'-di-t-butylphenyl]indenyl; 2-n-butyl-4-[3',5'-di-t-butylphenyl]indenyl; 2-sec-butyl-4-[3',5'-di-t-butylphenyl]indenyl; 2-methyl-4-[3',5'-di-phenylphenyl]indenyl; 2-ethyl-4-[3',5'-di-phenylphenyl]indenyl; 2-n-propyl-4-[3',5'-di-phenylphenyl]indenyl; 2-iso-propyl-4-[3',5'-di-phenylphenyl]indenyl; 2-n-butyl-4-[3',5'-di-phenylphenyl]indenyl; 2-sec-butyl-4-[3',5'-di-phenylphenyl]indenyl; 2-tert-butyl-4-[3',5'-di-phenylphenyl]indenyl; and the like. Further illustrative, but not limiting examples of preferred stereospecific metallocene compounds are the racemic isomers of 9-silafluorenylbis(indenyl) metal dichloride, -diethyl or -dimethyl, wherein the metal is titanium, zirconium or hafnium. Again, unsubstituted indenyl radicals are particularly preferred. In some embodiments, however the two indenyl groups may be replaced, independently of each other, by any of the substituted indenyl radicals listed above.

Particularly preferred metallocenes as transition metal compounds for use in the catalyst systems of the present invention together with the activators of formula (1) or (2) defined above for use in polymerizing olefins are rac-dimethylsilylbis(indenyl) hafnocenes or -zirconocenes, rac-dimethylsilylbis(2-methyl-4-phenylindenyl) hafnocenes or -zirconocenes, rac-dimethylsilylbis(2-methyl-indenyl) hafnocenes or -zirconocenes, and rac-dimethylsilylbis(2-methyl-4-naphthylindenyl) hafnocenes or -zirconocenes, wherein the hafnium and zirconium metal is substituted, in addition to the bridged bis(indenyl) substituent, by two further substituents, which are halogen, preferably chlorine or bromine atoms, or alkyl groups, preferably methyl and/or ethyl groups. Preferably, these additional substituents are both chlorine atoms or both methyl groups. Particularly preferred transition metal compounds are dimethylsilylbis (indenyl)hafnium dimethyl, rac-dimethylsilylbis(indenyl) zirconium dimethyl, rac-ethylenylbis(indenyl)zirconium dimethyl, and rac-ethylenylbis(indenyl)hafnium dimethyl.

Illustrative, but not limiting examples of preferred non-stereospecific metallocene catalysts are: [dimethylsilanediyl (tetramethylcyclopentadienyl)-(cyclododecylamido)]metal dihalide, [dimethylsilanediyl(tetramethylcyclopentadienyl) (t-butylamido)]metal dihalide, [dimethylsilanediyl(tetramethylcyclopentadienyl)(exo-2-norbomyl)]metal dihalide, wherein the metal is Zr, Hf, or Ti, preferably Ti, and the halide is preferably chlorine or bromine.

In a preferred embodiment, the transition metal compound is a bridged or unbridged bis(substituted or unsubstituted indenyl) hafnium dialkyl or dihalide.

Finally, also non-metallocene compounds that are active in catalyzing olefin polymerization reactions are suitable as the transition metal compound in the catalyst systems and the processes of the present invention. A particularly preferred species of non-metallocene catalysts are the pyridyl amines disclosed e.g., in WO 03/040201.

Activators and Activation Methods for Catalyst Compounds

The transition metal compounds are activated to yield the catalytically active, cationic transition metal compound having a vacant coordination site to which a monomer will coordinate and then be inserted into the growing polymer chain. In the process for polymerizing olefins according to the present invention, an activator of the following general formulae (1) or (2) is used to activate the transition metal compound:

Formula (1) is: $[R^1R^2R^3AH]^+[Y]^-$ (1)

wherein $[Y]^-$ is a non-coordinating anion (NCA) as further illustrated below,

A is nitrogen or phosphorus, $R^1$ and $R^2$ are hydrocarbyl groups or heteroatom-containing hydrocarbyl groups and together form a first, 3- to 10-membered non-aromatic ring with A, wherein any number of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may be substituted independently by one or more substituents selected from the group consisting of a hydrogen atom, halogen atom, $C_1$ to $C_{10}$ alkyl, $C_5$ to $C_{15}$ aryl, $C_6$ to $C_{25}$ arylalkyl, and $C_6$ to $C_{25}$ alkylaryl, and $R^3$ is a hydrogen atom or $C_1$ to $C_{10}$ alkyl, or $R^3$ is a $C_1$ to $C_{10}$ alkylene group that connects to said first ring and/or to said at least one second ring or ring system.

Formula (2) is: $[R_nAH]^+[Y]^-$ (2)

wherein $[Y]^-$ is a non-coordinating anion (NCA) as further illustrated below,

A is nitrogen, phosphorus or oxygen, n is 3 if A is nitrogen or phosphorus, and n is 2 if A is oxygen, and the groups R are identical or different and are a $C_1$ to $C_3$ alkyl group.

The present invention thus specifically relates to the new catalyst system itself, comprising a transition metal compound and an activator of the formula (1) shown above, to the use of an activator of said formula (1) for activating a transition metal compound in a catalyst system for polymerizing olefins, and to a process for polymerizing olefins the process comprising contacting under polymerization conditions one or more olefins with a catalyst system comprising a transition metal compound and an activator of formula (1).

The present invention also relates to a process for polymerizing olefins, the process comprising contacting, under polymerization conditions, one or more olefins with a catalyst system comprising a transition metal compound and an activator of formula (2) as shown above. In this process, the Mw of the polymer formed increases with increasing monomer conversion at a given reaction temperature.

Both the cation part of formulae (1) and (2) as well as the anion part thereof, which is an NCA, will be further illustrated below. Any combinations of cations and NCAs disclosed herein are suitable to be used in the processes of the present invention and are thus incorporated herein.

Activators—The Cations

The cation component of the activator of formulae (1) or (2) above is usually a protonated Lewis base capable of protonating a moiety, such as an alkyl or aryl, from the transition metal compound. Thus, upon release of a neutral leaving group (e.g. an alkane resulting from the combination of a proton donated from the cationic component of the activator and an alkyl substituent of the transition metal compound) a transition metal cation results, which is the catalytically active species.

In the polymerization process of the present invention an activator of above-depicted formula (2) may be used, wherein the cationic component has the formula $[R_nAH]^+$, wherein:

A is nitrogen, phosphorus or oxygen, n is 3 if A is nitrogen or phosphorus, and n is 2 if A is oxygen, and the groups R are identical or different and are a $C_1$ to $C_3$ alkyl group. $[R_nAH]^+$ may thus be an ammonium, phosphonium or oxonium component, as A may be nitrogen, phosphorus or oxygen.

In one preferred embodiment of formula $[R_nAH]^+$, A is nitrogen or phosphorus, and thus n is 3, and the groups R are identical. More preferably, n is 3, and the groups R are all identically methyl, ethyl or propyl groups, more preferably

[R$_n$AH]$^+$ is trimethylammonium or -phosphonium, triethylammonium or -phosphonium, tri(iso-propyl)ammonium or -phosphonium, tri(n-propyl)ammonium or -phosphonium. Trimethylammonium is particularly preferred. If [R$_n$AH]$^+$ is an oxonium compound (with n being 2), it is preferably the oxonium derivative of dimethyl ether, diethyl ether, tetrahydrofurane and dioxane.

In another embodiment, an activator of above-depicted formula (1) is used in the polymerization process of the present invention, the cationic component of which has the formula [R$^1$R$^2$R$^3$AH]$^+$, wherein A is nitrogen or phosphorus, R$^1$ and R$^2$ are hydrocarbyl groups or heteroatom-containing hydrocarbyl groups and together form a first, 3- to 10-membered non-aromatic ring with A, wherein any number, preferably two, three, four or five, more preferably two, of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may independently be substituted by one or more substituents selected from the group consisting of a hydrogen atom, halogen atom, $C_1$ to $C_{10}$ alkyl, preferably $C_1$ to $C_5$ alkyl, $C_5$ to $C_{15}$ aryl, preferably $C_5$ to $C_{10}$ aryl, $C_6$ to $C_{25}$ arylalkyl, and $C_6$ to $C_{25}$ alkylaryl, and R$^3$ is a hydrogen atom or $C_1$ to $C_{10}$ alkyl or a $C_1$ to $C_{10}$ alkylene group that connects to said first ring and/or said at least second ring or ring system. Since R$^1$ and R$^2$ may also be heteroatom (e.g. nitrogen, phosphorus or oxygen)-containing hydrocarbyl groups, the 3- to 10-membered ring they are forming with A and/or the at least one second ring or ring system may contain one or more additional heteroatoms (in addition to A), such as nitrogen and/or oxygen. Nitrogen is a preferred additional heteroatom that may be contained once or several times in said first ring and/or said at least one second ring or ring system. Any additional heteroatom, preferably nitrogen, may preferably be substituted independently by a hydrogen atom, or $C_1$ to $C_5$ alkyl.

One preferred embodiment of the cation in formula (1) is depicted in the following formula (1)':

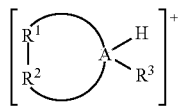

(1)'

In formula (1)' R$^1$ and R$^2$ together are a —(CH$_2$)$_a$— (i.e., alkylene) group with a being 3, 4, 5 or 6, and A is preferably nitrogen, R$^3$ is a hydrogen atom or $C_1$ to $C_{10}$ alkyl, or R$^3$ is a $C_1$ to $C_{10}$ alkylene group that connects to the ring formed by A, R$^1$, and R$^2$. In a specific embodiment, R$^3$ is an alkylene group with 1, 2 or 3 carbon atoms which is connected to the ring formed by R$^1$, R$^2$ and A. R$^1$, R$^2$ and/or R$^3$ may also be aza- or oxa-alkylene groups. R$^1$ and R$^2$ preferably form a 4-, 5-, 6- or 7-membered, non-aromatic ring with the nitrogen atom A.

Preferably, A in formula (1) or (1)' is nitrogen, and R$^1$ and R$^2$ together are a —(CH$_2$)$_a$— group (also referred to as "alkylene" group) with a being 3, 4, 5 or 6, or R$^1$ and R$^2$ may also be aza- or oxa-alkylene groups as mentioned above. R$^1$ and R$^2$ preferably form a 4, 5-, 6- or 7-membered, non-aromatic ring with the nitrogen atom A. Non-limiting examples of such ring are piperidinium, pyrrolidinium, piperazinium, indolinium, isoindolinium, imidazolidinium, morpholinium, pyrazolinium etc. The additional substituent at A, R$^3$, is in any of these cases preferably $C_1$ to $C_5$ alkyl, more preferably $C_1$ to $C_4$ alkyl, even more preferably $C_1$ to $C_3$ alkyl, and more preferably methyl or ethyl. R$_3$ may also be a $C_1$ to $C_5$ alkylene group, preferably a $C_1$ to $C_4$ alkylene group, more preferably a $C_1$ to $C_3$ alkylene group and more preferably a —(CH$_2$)$_3$—, —(CH$_2$)$_2$ or —CH$_2$— group that connects to the first ring containing R$^1$, R$^2$ and A and/or the at least second ring or ring system fused to the first ring. Thus, [R$^1$R$^2$R$^3$AH]$^+$ can also form a tricyclic structure, for example but not limited to the following ones (which may be further substituted in one or more positions by any substituents mentioned above and may contain unsaturations, but are preferably not aromatic):

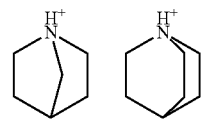

If additional heteroatoms are present in the first ring and/or the at least one second ring or ring system, structures like the following, nonlimiting example (which, again, may be further substituted by one or more substituents as mentioned above and may contain unsaturations, but are preferably not aromatic) may be used as the cation:

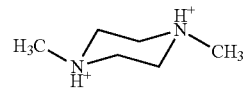

In another preferred embodiment the ring formed by R$^1$, R$^2$ and A is fused to at least one other aliphatic or aromatic ring or ring system. For example, in the case that R$^1$, R$^2$ and A form a 5- or 6-membered aliphatic first ring with the heteroatom being phosphorus or nitrogen, one or more 5- or 6-membered aromatic rings or ring systems may be fused to said first ring via adjacent carbon atoms of the first ring.

In a preferred embodiment, [R$^1$R$^2$R$^3$AH]$^+$ is N-methylpyrrolidinium, N-methylpiperidinium, N-methyldihydroindolinium or N-methyldihydroisoindolinium.

In another preferred embodiment the cation in formula (1) is depicted as one of the following four formulae (which are based upon formula (1) and are included when formula (1) is referred to herein):

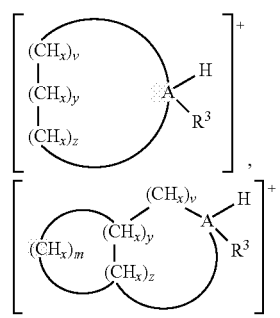

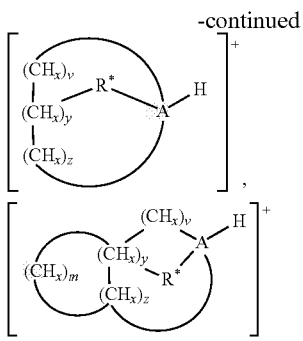

wherein each x is 0, 1 or 2, y is 3, 4, 5, 6, 7, 8, 9, or 10, (preferably 3, 4, 5, or 6), v is 1, 2, 3, 4, 5, 6, or 7 (preferably 0, 1, 2 or 3), z is 1, 2, 3, 4, 5, 6, or 7 (preferably 0, 1, 2 or 3), and v+y+z=3, 4, 5, 6, 7, 8, 9, or 10 (preferably v+y+z=3, 4, 5 or 6), m is 1, 2, 3, 4, 5, 6, 7, 8, 9 or 10 (preferably 1, 2, 3, or 4), A is nitrogen or phosphorus (preferably nitrogen), $R^3$ is a hydrogen atom or $C_1$ to $C_{10}$ alkyl, R* is a $C_1$ to $C_{10}$ alkyl, where any of the ($CH_x$) groups may be substituted, independently, by one or more substituents selected from the group consisting of a halogen atom, $C_1$ to $C_{10}$ alkyl, $C_5$ to $C_{15}$ aryl, $C_6$ to $C_{25}$ arylalkyl, and $C_6$ to $C_{25}$ alkylaryl. In another embodiment, at least one of the ($CH_x$) groups is replaced by a heteroatom, preferably nitrogen. In a preferred embodiment, the rings depicted in the formulae above are saturated or partially unsaturated, but are preferably not aromatic. Alternately, the ring containing ($CH_x)_v$, ($CH_x)_y$, and ($CH_x)_z$ is not aromatic, while the ring containing ($CH_x)_m$ may or may not be aromatic.

The activator in the present process may also be a combination of at least two different activators of formulas (1) and/or (2). For example two different ammonium components may be used at the same time with the same or different NCA's. Using two different cationic compounds in the activators according to formulas (1) and/or (2) can result in broadened MWDs and a broader range of melting points in the resulting polyolefins and can thus be used to tailor polymer properties. For example, N-methylpyrrolidinium and trimethylammonium may be used in combination together with the same NCA as defined below, particularly those such as tetrakis(pentafluorophenyl)borate and tetrakis (heptafluoronaphthyl)borate. Furthermore, in order to obtain the same effect as a mixture of cationic components, an activator with one cationic component may be used, while a second Lewis base may be added as a free base.

The Non-Coordinating Anion (NCA)

In the activators of formulae (1) and (2) above, $[Y]^-$ is a non-coordinating anion (NCA). The term "non-coordinating anion" means an anion that does not coordinate to the metal cation of the catalyst or that does coordinate to the metal cation, but only weakly. NCA's are usually relatively large (bulky) and capable of stabilizing the active catalyst species which is formed when the compound and the activator are combined. Said anion must still be sufficiently labile to be displaced by unsaturated monomers. Further, the anion will not transfer an anionic substituent or fragment to the cation of the transition metal compound as to cause it to form a neutral transition metal compound and a neutral by-product from the anion. Thus, suitable NCAs are those which are not degraded to neutrality when the initially formed complex decomposes. Two classes of compatible NCAs useful herein have been disclosed e.g. in EP-A-0 277 003 and EP-A-0277 004. They include: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

The anion component $[Y]^-$ includes those having the formula $[M^{k+}Q_n]^{d-}$ wherein k is an integer from 1 to 3; n is an integer from 2 to 6; n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radical, said Q having up to 20 carbon atoms with the proviso that in not more than one occurrence is Q a halide (but more than one q may be a halide containing group). Preferably, each Q is a fluorinated hydrocarbyl having 1 to 20 carbon atoms, more preferably each Q is a fluorinated aryl group, and more preferably each Q is a perfluorinated aryl group. Examples of suitable $[Y]^-$ also include diboron compounds as those disclosed in U.S. Pat. No. 5,447,895.

$[Y]^-$ is preferably $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups. Preferred examples of $[Y]^-$ for use in the present invention are: tetraphenylborate, tetrakis(pentafluorophenyl)borate, tetrakis-(2,3,4,6-tetrafluorophenyl)borate, tetrakis-(perfluoronaphthyl)borate (also referred to as tetrakis(heptafluoronaphthyl)borate), tetrakis(perfluorobiphenyl)borate, and tetrakis(3,5-bis(trifluoromethyl)phenyl)borate. Particularly preferred $[Y]^-$ are tetrakis(pentafluorophenyl)borate and tetrakis (heptafluoronaphthyl)borate.

Any of the NCA's $[Y]^-$ illustrated herein can be used in combination with any cation component of the activator of formula (1) or (2) as defined hereinabove. Thus, any combination of preferred components [Y] and preferred components $[R^1R^2R^3AH]^+$ or $[R_nAH]^+$ are considered to be disclosed and suitable in the processes of the present invention.

Preferred Activators

Preferred activators of formula (1) in the catalyst systems of the present invention and used in the polymerization processes of the present invention are those wherein A is nitrogen, $R^1$ and $R^2$ together are a —$(CH_2)_a$— group with a being 3, 4, 5, or 6, and $R^3$ is $C_1$, $C_2$, $C_3$, $C_4$ or $C_5$ alkyl, and $[Y]^-$ is $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups, and preferably $R^4$ is a perhalogenated aryl group, more preferably a perfluorinated aryl group, more preferably pentafluorophenyl, heptafluoronaphthyl or perfluorobiphenyl. Preferably, these activators are combined with transition metal compound (such as a metallocene) to form the catalyst systems of the present invention.

Preferred activators in the catalyst systems of formula (2) in the catalyst systems used in the polymerization processes of the present invention are those wherein A is nitrogen, n is 3, all groups R are identical and are methyl, ethyl or isopropyl, and $[Y]^-$ is $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups, and preferably $R^4$ is a perhalogenated aryl group, more preferably a perfluorinated aryl group, more preferably pentafluorophenyl, heptafluoronaphthyl or perfluorobiphenyl. Preferably, these activators are combined with a transition metal compound (such as a metallocene) to form the catalyst systems of the present invention.

In the polymerization process of the present invention, in addition to the preferred activators of formula (1) mentioned in the preceding paragraph also the activators of formula (2) wherein A is nitrogen and all groups R are identically methyl or ethyl, and wherein $[Y]^-$ is defined as in the preceding paragraph are preferably used. Again, these activators are preferably combined with a metallocene (e.g. as explained herein below) to form the catalyst systems used in the polymerization process of the present invention.

Preferred Catalyst Systems

Preferred combinations of transition metal compound and activator in the catalyst systems for olefin polymerization according to the present invention comprise the following components:

- a metallocene compound, preferably a dialkylsilyl-bridged bis(indenyl) metallocene, wherein the metal is a group 4 metal and the indenyl is unsubstituted, or if substituted, is substituted by one or more substituents selected from the group consisting of a $C_1$ to $C_{10}$ alkyl, $C_5$ to $C_{15}$ aryl, $C_6$ to $C_{25}$ arylalkyl, and $C_6$ to $C_{25}$ alkylaryl; more preferably dimethylsilylbis(indenyl) metal dichloride or -dimethyl, ethylenylbis(indenyl) metal dichloride or -dimethyl, dimethylsilylbis(2-methyl-4-phenylindenyl) metal dichloride or -dimethyl, dimethylsilylbis(2-methyl-indenyl) metal dichloride or -dimethyl, and dimethylsilylbis(2-methyl-4-naphthylindenyl) metal dichloride or -dimethyl, wherein in all cases the metal may be zirconium or hafnium;
- a cationic component $[R^1R^2R^3AH]^+$ wherein preferably A is nitrogen, $R^1$ and $R^2$ are together an $-(CH_2)_a-$ group, wherein a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, more preferably N-methylpyrrolidinium or N-methylpiperidinium; or a cationic component $[R_nAH]^+$ wherein preferably A is nitrogen, n is 3 and all R are identical and are $C_1$ to $C_3$ alkyl groups, more preferably trimethylammonium or triethylammonium; and
- an anionic component $[Y]^-$ which is an NCA, preferably of the formula $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups, preferably perhalogenated aryl groups, more preferably perfluorinated aryl groups, and more preferably pentafluorophenyl, heptafluoronaphthyl or perfluorobiphenyl.

More preferably, the activator for use in any of the polymerization processes according to the present invention is trimethylammonium tetrakis(pentafluorophenyl)borate, N-methylpyrrolidinium tetrakis(pentafluorophenyl)borate, trimethylammonium tetrakis(heptafluoronaphthyl)borate, or N-methylpyrrolidinium tetrakis(heptafluoronaphthyl) borate. The metallocene is preferably rac-dimethylsilyl bis (indenyl)zirconium dichloride or -dimethyl, rac-dimethylsilyl bis(indenyl)hafnium dichloride or -dimethyl, rac-ethylenyl bis(indenyl)zirconium dichloride or -dimethyl or rac-ethylenyl bis(indenyl)hafnium dichloride or -dimethyl.

In another embodiment, a preferred transition metal compound comprises a bis indenyl compound represented by the formula:

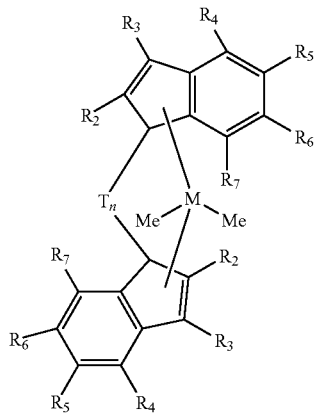

wherein M is a group 4 metal, preferably hafnium, T is a bridging group (such as an alkylene (methylene, ethylene) or a di substituted silyl or germyl group, (such as dimethyl silyl)), n is 0 or 1, $R_2$, $R_3$, $R_4$, $R_5$, $R_6$, and $R_7$ are hydrogen, a heteroatom, a substituted heteroatom group, a substituted or unsubstituted alkyl group, and a substituted or unsubstituted aryl group (preferably a substituted or unsubstituted alkyl or a substituted or unsubstituted aryl group). In a preferred embodiment $R_2$ is hydrogen. In another preferred embodiment $R_2$ and $R_4$ are hydrogen. In another preferred embodiment $R_2$ is hydrogen and $R_4$ is $C_1$ to $C_{20}$ alkyl (preferably methyl) or an aryl group (such as substituted or unsubstituted phenyl). In another preferred embodiment $R_2$ and $R_4$ are methyl. In another embodiment $R_2$ and $R_4$ are not methyl. In another embodiment $R_2$ is not methyl. In another preferred embodiment, $R_3$, $R_4$, $R_5$, $R_6$, and $R_7$ are hydrogen and $R_2$ is substituted or unsubstituted alkyl or substituted or unsubstituted aryl (preferably methyl). In another preferred embodiment, $R_2$, $R_3$, $R_5$, $R_6$, and $R_7$ are hydrogen and $R_4$ is substituted or unsubstituted alkyl or substituted or unsubstituted aryl (preferably methyl or phenyl).

Any catalyst system resulting from any combination of the preferred metallocene compound, preferred cationic component of the activator and preferred anionic component of the activator mentioned in the preceding paragraph shall be explicitly disclosed and may be used in accordance with the present invention in the polymerization of one or more olefin monomers. Also, combinations of two different activators can be used with the same or different metallocene(s).

Scavengers or Additional Activators

The catalyst systems suitable for all aspects of the present invention may contain, in addition to the transition metal compound and the activator described above, also additional (additional activators or scavengers) as explained in the following.

A co-activator is a compound capable of alkylating the transition metal complex, such that when used in combination with an activator, an active catalyst is formed. Co-activators include alumoxanes as mentioned in the following, and aluminum alkyls as further listed below. An alumoxane is preferably an oligomeric aluminum compound represented by the general formula $(R^x-Al-O)_n$, which is a cyclic compound, or $R^x(R^x-Al-O)_nAlR^x_2$, which is a linear compound. Most common alumoxane is a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and "n" is an integer from 1-50. More preferably, $R^x$ is methyl and "n" is at least 4. Methyl alumoxane (MAO) as well as modified MAO, referred to herein as MMAO, containing some higher alkyl groups to improve the solubility, ethyl alumoxane, iso-butyl alumoxane and the like are useful herein. Particularly useful MAO can be purchased from Albemarle in a 10 wt. % solution in toluene. Co-activators are typically only used in combination with Lewis acid activators and ionic activators when the pre-catalyst is not a dihydrocarbyl or dihydride complex.

In some embodiments of the invention, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. More preferred aluminum alkyls include triethylaluminum, diethylaluminum chloride, ethylaluminium dichloride, tri-iso-butylaluminum, tri-n-octylaluminum, tri-n-hexylaluminum, trimethylaluminum and combinations thereof. Preferred boron alkyls include triethylboron. Scavenging compounds may also be alumoxanes and modified alumoxanes including methylalumoxane and modified methylalumoxane.

Method of Preparing Catalyst System

The catalyst systems of the present invention can be prepared according to methods known in the art. For obtaining the cations of the activators of formula (1) or (2) as defined hereinabove, for example ammonium cations can be provided as salts that can be synthesized by the reaction of an amine with an acid in which the conjugate base of the acid remains as the counteranion or is exchanged with other anions. See "Organic Chemistry," Pine et al., $4^{th}$ edition, McGraw-Hill, 1980. A useful synthesis for example is the reaction of a slight excess of HCl (as an $Et_2O$ solution) with the amine in hexanes resulting in the immediate precipitation of the amine hydrochloride. The chloride can be replaced by anion exchange with a suitable NCA according to the present invention. See references Chemische Berichte, 1955, Vol. 88, p. 962, or U.S. Pat. No. 5,153,157 and references therein. Phosphines and ethers are similarly protonated with acids and can undergo anion exchange reactions to the desired phosphonium salts, see for example German Patent DE 2116439.

The catalyst systems may also include a support material or carrier. Generally the support is a porous material, for example, talc, or an inorganic oxide. Other suitable support materials include zeolites, clays, and organoclays.

Preferred support materials are inorganic oxides that include Group 2, 3, 4, 5, 13 or 14 metal oxides. Preferred supports include silica, which may or may not be dehydrated, fumed silica, alumina (WO 99/60033), silica-alumina and mixtures thereof. Other useful supports include magnesia, titania, zirconia, montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like.

It is preferred that the support material have a surface area in the range of from about 10 to about 700 $m^2$/g, pore volume in the range of from about 0.1 to about 4.0 cc/g and average particle size in the range of from about 5 to about 500 μm. More preferably, the surface area of the support material is in the range of from about 50 to about 500 $m^2$/g, pore volume of from about 0.5 to about 3.5 cc/g and average particle size of from about 10 to about 200 μm. More preferably, the surface area of the support material is in the range is from about 100 to about 400 $m^2$/g, pore volume from about 0.8 to about 3.0 cc/g and average particle size is from about 5 to about 100 μm. The average pore size of the carrier useful in the invention typically has pore size in the range of from 10 to 1000 Å, preferably 50 to about 500 Å, and more preferably 75 to about 350 Å.

Polymerization Process

Any known polymerization process may be used to produce the present copolymer. Polymerization methods include high pressure, slurry, gas, bulk, suspension, supercritical, solution phase, and combination thereof. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By continuous process is meant that there is continuous addition to, and withdrawal of reactants and products from, the reactor system. Continuous processes can be operated in steady state, i.e., the composition of effluent remains fixed with time if the flow rate, temperature/pressure and feed composition remain invariant. For example a continuous process to produce a polymer would be one where the reactants are continuously introduced into one or more reactors and polymer product is continuously withdrawn.

The catalyst systems described herein can be used advantageously in a homogeneous solution process. Generally this involves polymerization in a continuous reactor in which the polymer formed and the starting monomer and catalyst materials supplied are agitated to reduce or avoid concentration gradients. Some useful processes operate above the cloud point of the polymers at high pressures. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutene, mixed butanes, hexane, pentane, isopentane, isohexane, cyclohexane, isooctane, and octane.

Temperature control in the reactor is typically obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature also depends on the catalyst used. In general, the reactor temperature is in the range from about 30° C. to about 250° C., preferably from about 60° C. to about 200° C. The pressure is generally in the range from atmospheric pressure up to high pressures such as about 300 MPa, about 200 MPa or about 100 MPa. Also lower pressures up to about 50, about 40, about 30, about 20 or about 15 MPa are suitable. The lower end of the possible pressure range may be anything from about 0.1 MPa, such as 0.5 MPa, about 1 MPa or about 2.0 MPa. In at least one specific embodiment, the reactor pressure is less than 600 pounds per square inch (psi) (4.14 MPa), or less than 500 psi (3.45 MPa) or less than 400 psi (2.76 MPa), or less than 300 psi (2.1 MPa), such as from about atmospheric pressure to about 400 psi (2.76 MPa). In another embodiment reactor pressure is from about 400 psi (2.76 MPa) to about 4000 psi (27.6 MPa), or from about 1000 psi (6.9

MPa) to 2000 psi (13.8 MPa), or from about 1200 psi (8.27 MPa) to 1800 psi (12.4 MPa).

The monomer concentration in the reactor (based on the entire reaction mixture) may be anywhere from very dilute up to using a monomer as the solvent. Suitable monomer concentrations may be, for example up to about 2 mol/L, up to about 5 mol/L, up to about 10 mol/L, or even higher, such as up to about 15 mol/L.

Uses of the Copolymer

The ethylene-based copolymers described herein, both alone and in combination with other materials, are suitable for use in such articles as films, fibers and nonwoven fabrics, extruded and molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Examples of fibers include but are not limited to spun bond and melt blown fiber operations for use in woven or non-woven form to make filters, diaper fabrics, hygiene products, medical garments, geotextiles, etc. Examples of extruded or molded articles include tubing, medical tubing, or wire and cable coatings.

Other desirable articles that can be made from and/or incorporate the the copolymers include automotive components and sporting equipment. More particularly, automotive components include such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other articles that may be formed by any extrusion or molding technique include or incorporate liquid storage containers for medical uses such as bags, pouches, and bottles for storage and IV infusion of blood or solutions; wrapping or containing food preserved by irradiation, other medical devices including infusion kits, catheters, and respiratory therapy, as well as packaging materials for medical devices and food which may be irradiated by gamma or ultraviolet radiation including trays, as well as stored liquid, particularly water, milk, or juice, containers including unit servings and bulk storage containers.

The ethylene-based copolymers described herein, particularly at low ethylene contents, are also useful as rheology modifiers and, in particular, viscosity enhancers, for lubricating oil compositions. Examples of the lubricating base oils that can be used with the current copolymers include mineral oils and synthetic oils, such as poly-α-olefins, polyol esters, and polyalkylene glycols. A mineral oil or a blend of a mineral oil and a synthetic oil is preferably employed. The mineral oil is generally used after purification such as dewaxing. Although mineral oils are divided into several classes according to the purification method, suitable mineral oils generally have a wax content of about 0.5 wt. % to about 10 wt. %. Further, a mineral oil having a kinematic viscosity of 10 to 200 cSt is generally used.

Suitable base oils include those conventionally employed as crankcase lubricating oils for spark-ignited and compression-ignited internal combustion engines, such as automobile and truck engines, marine and railroad diesel engines, and the like. Advantageous results are also achieved by employing the ethylene-based copolymers in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation of the present ethylene-based copolymers.

Suitable base oils include not only hydrocarbon oils derived from petroleum, but also include synthetic lubricating oils such as esters of dibasic acids, complex esters made by esterification of monobasic acids, polyglycols, dibasic acids and alcohols, polyolefin oils, etc. Thus, ethylene-based copolymers are suitably incorporated into synthetic base oils such as alkyl esters of dicarboxylic acids, polyglycols and alcohols, polyalpha-olefins, polybutenes, alkyl benzenes, organic esters of phosphoric acids, polysilicone oils.

The above oil compositions may optionally contain other conventional additives, such as, for example, pour point depressants, antiwear agents, antioxidants, other viscosity-index improvers, dispersants, corrosion inhibitors, anti-foaming agents, detergents, rust inhibitors, friction modifiers, and the like.

In general, the amount of the present ethylene-based copolymer added to a lubricating oil composition to increase its viscosity is between about 0.01 wt. % and about 10 wt. %, such as between about 0.2 wt. % and about 5 wt % of said lubricating oil composition.

The ethylene-based copolymers are also useful as blending components for conventional polymer compositions, e.g., ethylene homopolymers or copolymers, or propylene homopolymers or copolymers, and in thermoplastic vulcanizates ("TPV"). Further, such ethylene-based copolymers can be useful as additives or primary components in molded articles, extrudates, films, e.g., blown films, etc., woven and nonwoven fabrics, adhesives, and conventional elastomer applications.

Particularly when produced by solution polymerization, the present copolymers will provide free-flowing pellets having a melt flow rate (MFR) in the range of about 0.5 to about 10 g/10 minutes (as measured at 230° C. and 2.16 kg). It will be appreciated that such pellets will have less tendency to cohere together and agglomerate and to the processing equipment en route to the duster, in the duster itself, and in the conveying equipment from the duster to the baler as compared with polymers that have no crystallinity or have a melting point below the operating temperature of the finishing equipment (about 30° C.). In addition, conventional polymers, that have an MFR above 2 g/10 minutes that are amorphous or have a melting point below the operating temperature of the finishing equipment (about 30° C.), have no structural integrity and are typically packaged in bales. The present copolymers can be packaged in bags, which is more efficient and economical.

The invention will now be more particularly described with reference to the Examples and the accompanying drawing.

In the Examples weight-average and number-average molecular weights were determined by GPC using a Waters Alliance 2000 gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with ~250 ppm of butylated hydroxy toluene (BHT). The flow rate used was 1.0 mL/min. Three (Polymer Laboratories) PLgel Mixed-B columns were used. This technique is discussed in "Macromolecules," Vol. 34, No. 19, pp. 6812-6820, and "Macromolecules," Vol. 37, No. 11, pp. 4304-4312, both of which are incorporated herein by reference.

The separation efficiency of the column set was calibrated using a series of narrow molecular weight distribution polystyrene standards, which reflects the expected molecular weight range for samples and the exclusion limits of the column set. At least 10 individual polystyrene standards, ranging from Mp ~580 to 10,000,000, were used to generate the calibration curve. The polystyrene standards were obtained from Polymer Laboratories (Amherst, Mass.) or an equivalent source. To assure internal consistency, the flow rate was corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (log Mp vs. retention volume) was generated by recording the retention volume at the peak in the DRI signal for each PS standard, and fitting this data set to a second order polynomial. Polystyrene standards were graphed using Viscotec 3.0 software. Samples were analyzed using WaveMetrics, Inc. IGOR Pro and Viscotec 3.0 software using updated calibration constants.

Peak melting point (Tm) and peak crystallization temperature (Tc), glass transition temperature (Tg), and heat of fusion (ΔH) were determined using the following procedure according to ASTM D3418-03. Differential scanning calorimetric (DSC) data were obtained using a Perkin Elmer Pyris 1 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 5 minutes then cooled down to −100° C. at a rate of 10° C./minute before a second cooling-heating cycle was applied. Both the first and second cycle thermal events were recorded. Areas under the endothermic peaks of the $2^{nd}$ melting curve were measured and used to determine the heat of fusion. The melting and crystallization temperatures reported here were obtained during the second heating/cooling cycle.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 $cm^{-1}$ to 4000 $cm^{-1}$ was recorded and the area under the propylene band at ~1165 $cm^{-1}$ and the area under the ethylene band at ~732 $cm^{-1}$ in the spectrum were calculated. The baseline integration range for the methylene rocking band is nominally from 695 $cm^{-1}$ to the minimum between 745 and 775 $cm^{-1}$. For the polypropylene band the baseline and integration range is nominally from 1195 to 1126 $cm^{-1}$. The ethylene content in wt. % was calculated according to the following equation:

$$\text{ethylene content (wt. \%)} = 72.698 - 86.495X + 13.696X^2$$

where X=AR/(AR+1) and AR is the ratio of the area for the peak at ~1165 $cm^{-1}$ to the area of the peak at ~732 $cm^{-1}$.

Additional Specific Embodiments

Also provided are the following additional embodiments:

A. An ethylene copolymer comprising 40 wt. % to 70 wt. % of units derived from ethylene and at least 30 wt. % of units derived from at least one α-olefin having 3 to 20 carbon atoms, wherein the copolymer has the following properties:
(a) a weight-average molecular weight (Mw), as measured by GPC, in the range of 50,000 to 200,000 g/mol;
(b) a melting point (Tm) in ° C., as measured by DSC, that satisfies the relation:

$$Tm > 3.4 \times E - 180$$

where E is the weight % of units derived from ethylene in the copolymer;
(c) a ratio of Mw/Mn of 1.8 to 2.5;
(d) a content of Group 4 metals of no more than 5 ppm; and
(e) a ratio of wt ppm Group 4 metals/wt ppm Group 5 metals of at least 3.

B. The copolymer of embodiment A comprising 40 wt. % to 55 wt. % of units derived from ethylene.

C. The copolymer of embodiment B comprising 60 wt. % to 45 wt. % of units derived from at least one α-olefin having 3 to 20 carbon atoms.

D. The copolymer of any preceding embodiment having a melting point (Tm) in ° C., as measured by DSC, that satisfies the relation:

$$Tm > 3.4 \times E - 170,$$

preferably Tm>3.4×E−160;
more preferably Tm>3.4×E−90
where E is the weight % of units derived from ethylene in the copolymer.

E. An ethylene copolymer comprising 70 wt. % to 85 wt. % of units derived from ethylene and at least 12 wt. % of units derived from at least one α-olefin having 3 to 20 carbon atoms, wherein the copolymer has the following properties:
(a) a weight-average molecular weight (Mw), as measured by GPC, in the range of 50,000 to 200,000 g/mol;
(b) a melting point (Tm), as measured by DSC, of at least 100° C.;
(c) a ratio of Mw/Mn of 1.8 to 2.5;
(d) a content of Group 4 metals of no more than 5 ppm; and
(e) a ratio of wt ppm Group 4 metals/wt ppm Group 5 metals of at least 3.

F. The copolymer of embodiment E having a melting point (Tm), as measured by DSC, of at least 110° C.

G. The copolymer of any preceding embodiment wherein said at least one α-olefin is selected from propylene, butene, hexene and octene, and preferably comprises propylene.

H. The copolymer of any preceding embodiment containing no more than 25 ppm of Zn.

I. A process of producing the copolymer of any one of embodiments A to D, G and H, the process comprising contacting a monomer mixture comprising 40 wt. % to 70 wt. % of ethylene and at least 30 wt. % of at least one α-olefin having 3 to 20 carbon atoms under polymerizations conditions with a catalyst composition comprising a bridged bis-indenyl complex of a transition metal.

J. A process of producing the copolymer of any one of embodiments E to H, the process comprising contacting a monomer mixture comprising 70 to 85 wt. % of ethylene and at least 12 wt. % of at least one α-olefin having 3 to 20 carbon atoms under polymerizations conditions with a catalyst composition comprising a bridged bis-indenyl complex of a transition metal.

K. The process of embodiment I or embodiment J wherein the transition metal comprises hafnium and/or zirconium.

L. The process of any one of embodiments I to K wherein the bridged bis-indenyl complex comprises a dialkylsilyl bridging group, and preferably comprises dimethylsilylbis-indenylhafnium dimethyl.

M. The process of any one of embodiments I to L wherein the catalyst composition comprises a fluoroarylborate activator, and preferably comprises a perfluorophenylborate activator.

N. The process of any one of embodiments I to M wherein the catalyst composition comprises a rac-dimethylsilylbis-indenyl hafnium dimethyl and a trimethylammonium tetrakis-pentafluorophenylborate activator.

O. A lubricating oil composition comprising (a) a lubricating oil base and (b) the ethylene copolymer of any one of embodiments A to D.

EXAMPLES 1 to 3

The polymer compositions in Examples 1 and 2 were synthesized in one continuous stirred tank reactor. The polymerization was performed in solution, using isohexane as a solvent. In the reactor, polymerization was performed at an overall pressure of 290 psi (2 MPa). Ethylene and propylene feed rates, and reactor temperatures are listed in Table 1.

The catalyst was rac-dimethylsilylbis(indenyl) hafnium dimethyl (metallocene) pre-activated with a trimethylammonium tetrakis(pentafluorophenyl)borate (activator) in a toluene solution that was fed into the reactor. The molar ratio of metallocene to activator was about 1:1.03. The metallocene concentration in toluene was $1.74*10^4$ moles/liter and the activator concentration was $1.68*10^{-4}$ moles/liter. The feed rate of the catalyst solution is listed in Table 1. Tri n-octyl aluminum (TNOA) was dissolved in isohexane at 25 wt % and fed into the reactor as a scavenger. The feed rate of the scavenger solution is listed in Table 1.

In the process, temperature control was used to achieve the desired molecular weight. The copolymer solution emerging from the reactor was stopped from further polymerization by addition of water and then devolatilized using conventionally known devolatilization methods such as flashing or liquid phase separation, first by removing the bulk of the isohexane to provide a concentrated solution, and then by stripping the remainder of the solvent in anhydrous conditions using a devolatilizer or a twin screw devolatilizing extruder so as to end up with a molten polymer composition containing less than 0.5 wt. % of solvent and other volatiles. The molten polymer was cooled until solid.

TABLE 1

| Example | 1 | 2 | 3 |
|---|---|---|---|
| weight of final polymer (grams) | 297.2 | 398 | 387 |
| % ethylene in the product | 46.27 | 47.09 | 48.77 |
| Cat feed rate (g/h) | 0.00516 | 0.00516 | 0.00516 |
| TNOA feed rate (mol//h) | $3.35 * 10^{-4}$ | $3.35 * 10^{-4}$ | $3.35 * 10^{-4}$ |
| C2 feed rate (g/h) | 330 | 358.7 | 358.7 |
| C3 feed rate (g/h) | 761.4 | 762.17 | 764.32 |
| C6 feed Rate (g/h) | 3564 | 3564 | 3564 |
| Reaction temp. (° C.) | 65 | 70 | 80 |
| Production Rate (g/h) | 324.6 | 426.6 | 402.7 |

The properties of the resultant copolymers are summarized in Table 2 and in FIG. 1, which also show the properties of copolymers produced according to Examples 6 to 8 of U.S. Pat. No. 6,589,920 ('920 Patent').

TABLE 2

| | MFR (g/10 min) | Ethylene (wt %) | DSC melting point (° C.) |
|---|---|---|---|
| Example 1 | 0.94 | 46.27 | 33.36 |
| Example 2 | 1.15 | 47.09 | 37.87 |
| Example 3 | 1.4 | 48.77 | 43.21 |
| '920 Patent Ex. 6 | | 47.2 | −38.5 |
| '920 Patent Ex. 7 | | 46.8 | −36.2 |
| '920 Patent Ex. 8 | | 49.6 | −40.8 |

It will be seen that the copolymers of the present Examples 1 to 3 have substantially higher, about 60° C. higher, melting points than the polymers made according to the '920 patent, indicating that the present polymers are structurally different than the polymers of the '920 patent.

EXAMPLES 4 to 6

The polymerization procedure used in Examples 4 to 6 was the same as described in Example 1 except for the reaction parameters summarized in Table 3.

TABLE 3

| Example | 4 | 5 | 6 |
|---|---|---|---|
| weight of final polymer (grams) | 39.5 | 27.3 | 103 |
| % ethylene in the product | 57.89 | 57.75 | 53.21 |
| Cat feed rate (g/h) | 0.00516 | 0.00516 | 0.00516 |
| TNOA feed rate (mol//h) | 0.12 | 0.12 | 0.12 |
| C2 feed rate (g/h) | 785.5 | 765.7 | 765.7 |
| C3 feed rate (g/h) | 250.9 | 320.9 | 320.9 |
| C6 feed Rate (g/h) | 3564 | 3564 | 3564 |
| Reaction temp. (° C.) | 100 | 120 | 100 |
| Production Rate (g/h) | 101.1 | 81.1 | 76.7 |

The properties of the resultant copolymers are summarized in Table 4 and in FIG. 1.

TABLE 4

| Example | 4 | 5 | 6 |
|---|---|---|---|
| MFR | 3.085 | 3.04* | 6.89 |
| C2 | 57.89 | 57.75 | 53.21 |
| Mn | 45066 | 33931 | 45917 |
| Mw | 110543 | 71202 | 98766 |
| Mz | 221631 | 138163 | 181746 |
| Mw(LS) | 118601 | 71296 | 110109 |
| DSC | 59.19 | 58.52 | 43 |
| Mw/Mn | 2.45 | 2.10 | 2.15 |
| Mz/Mw | 2.00 | 1.94 | 1.84 |
| Tm DSC | 59.19 | 58.52 | 43 |

*Second measurement was 14.5 g/10 min

EXAMPLES 7 to 11

The polymerization procedure used in Examples 7 to 11 was the same as described in Example 1 except for the reaction parameters summarized in Table 5 below. The properties of the resultant copolymers are summarized in Table 6 and in FIG. 1.

TABLE 5

| Example | 7 | 8 | 9 | 10 | 11 |
|---|---|---|---|---|---|
| % ethylene in the product | 77.1 | 81.9 | 75.6 | 80.8 | 85.4 |
| Cat feed rate (mol/min) | $1.12 * 10^{-7}$ | $1.12 * 10^{-7}$ | $1.12 * 10^{-7}$ | $1.12 * 10^{-7}$ | $1.12 * 10^{-7}$ |
| TNOA feed rate (g/h) | | | | | |
| C2 feed rate (g/h) | 6 | 8 | 6 | 8 | 10 |
| C3 feed rate (g/h) | 5.09 | 5.09 | 5.09 | 5.09 | 5.09 |
| C6 feed rate (ml/min) | 80 | 80 | 80 | 80 | 80 |
| Reaction temp. (° C.) | 130 | 130 | 120 | 120 | 120 |
| Production rate (g/min) | 4.4 | 5.4 | 4.7 | 6.4 | 7 |

TABLE 6

| Example | wt % C2 | Tm | Mn | Mw | Mz | Mw/Mn | Mz/Mw |
|---|---|---|---|---|---|---|---|
| 7 | 77.1 | 114.4 | 8617 | 52572 | 113630 | 6.10 | 2.16 |
| 8 | 81.9 | 117.83 | 14223 | 58027 | 127331 | 4.08 | 2.19 |
| 9 | 75.6 | 115.57 | 21517 | 75976 | 150445 | 3.53 | 1.98 |
| 10 | 80.4 | 117.05 | 20775 | 61843 | 123078 | 2.976799 | 1.990169 |
| 11 | 85.4 | 119.46 | 25840 | 98553 | 224636 | 3.813971 | 2.279342 |

While the present invention has been described and illustrated by reference to particular embodiments, those of ordinary skill in the art will appreciate that the invention lends itself to variations not necessarily illustrated herein. For this reason, reference should be made solely to the appended claims for purposes of determining the scope of the present invention.

What is claimed is:

1. A process of producing an ethylene copolymer, the process comprising contacting a monomer mixture comprising 70 wt. % to 85 wt. % of ethylene and at least 12 wt .% of at least one α-olefin having 3 to 20 carbon atoms under polymerizations conditions with a catalyst composition comprising a bridged bis-indenyl complex of a transition metal to produce a copolymer having the following properties:
   (a) a weight-average molecular weight (Mw), as measured by GPC, in the range of about 50,000 to about 200,000 g/mol;
   (b) a melting point (Tm), as measured by DSC, of at least 100° C.;
   (c) a ratio of Mw/Mn of about 1.5 to about 3.5;
   (d) a content of Group 4 metals of no more than 25 ppm; and
   (e) a ratio of wt ppm Group 4 metals/wt ppm Group 5 metals of at least 3.

2. The process of claim 1, wherein the catalyst composition comprises a perfluorophenylborate activator.

3. The process of claim 1, wherein the catalyst composition comprises a rac-dimethylsilylbisindenyl hafnium dimethyl and a trimethylammonium tetrakis-pentafluorophenylborate activator.

4. The process of claim 1, wherein the bridged bis-indenyl complex comprises a dialkylsilyl bridging group.

5. The process of claim 1, wherein the transition metal comprises hafnium and/or zirconium.

6. The process of claim 1, wherein the catalyst composition comprises dimethylsilylbisindenyl hafnium dimethyl.

7. The process of claim 1, wherein the catalyst composition comprises a fluoroarylborate activator.

* * * * *